United States Patent
Folke et al.

(10) Patent No.: US 8,879,492 B2
(45) Date of Patent: Nov. 4, 2014

(54) METHODS AND ARRANGEMENTS FOR HANDLING A DOWNLINK TRANSMISSION IN A CELLULAR NETWORK

(75) Inventors: Mats Folke, Luleå (SE); Sara Landström, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 196 days.

(21) Appl. No.: 13/518,013

(22) PCT Filed: Jul. 8, 2011

(86) PCT No.: PCT/EP2011/061639
§ 371 (c)(1),
(2), (4) Date: Jul. 27, 2012

(87) PCT Pub. No.: WO2013/007279
PCT Pub. Date: Jan. 17, 2013

(65) Prior Publication Data
US 2013/0010713 A1     Jan. 10, 2013

(51) Int. Cl.
*H04W 4/00* (2009.01)
*H04W 72/08* (2009.01)
*H04W 16/10* (2009.01)

(52) U.S. Cl.
CPC ............ *H04W 72/085* (2013.01); *H04W 16/10* (2013.01)
USPC .......................................... 370/329; 455/422

(58) Field of Classification Search
CPC .............................. H04W 16/10; H04W 72/085
See application file for complete search history.

(56) References Cited

U.S. PATENT DOCUMENTS

| 2010/0009634 | A1 | 1/2010 | Budianu et al. |
| 2011/0151790 | A1 | 6/2011 | Khandekar et al. |
| 2012/0003970 | A1* | 1/2012 | Iwamura .................... 455/422.1 |
| 2013/0010713 | A1* | 1/2013 | Folke et al. .................... 370/329 |
| 2014/0016597 | A1* | 1/2014 | Zhang .......................... 370/329 |

FOREIGN PATENT DOCUMENTS

WO    2009120934 A1    10/2009

OTHER PUBLICATIONS

Lopez-Perez, et al., "Enhanced Intercell Interference Coordination Challenges in Heterogeneous Networks", IEEE Wireless Communications, Jun. 2011, 22-30.

* cited by examiner

*Primary Examiner* — David Oveissi
(74) *Attorney, Agent, or Firm* — Murphy, Bilak & Homiller, PLLC (57) ABSTRACT

A method in a first base station (105) for handling a downlink transmission is provided. The first base station (105) serves a first user equipment (120). The first base station (105) defines a subframe in which the first base station (105) is to avoid interfering a downlink radio channel between a second base station (115) and a second user equipment (125). The second user equipment (125) is located in an extended range of the second base station (120). The first base station (105) performs, in the defined subframe, a downlink transmission to the first user equipment (120). The first base station (105) receives, from the second base station (115), an indication of an interference caused by the performed downlink transmission on the downlink radio channel. The first base station (105) adjusts a further downlink transmission to be performed by the first base station (105) based on the indication.

24 Claims, 6 Drawing Sheets

METHODS AND ARRANGEMENTS FOR HANDLING A DOWNLINK TRANSMISSION IN A CELLULAR NETWORK

TECHNICAL FIELD

Embodiments herein relate to a base station and a method in a base station. In particular, embodiments herein relate to handling a downlink transmission.

BACKGROUND

In a typical cellular network, also referred to as a wireless communication system, user equipments communicate via a radio access network to one or more core networks.

A user equipment is a mobile terminal by which a subscriber can access services offered by an operator's core network. The user equipments may be for example communication devices such as mobile telephones, cellular telephones, laptops or tablet computers, sometimes referred to as surf plates, with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the cellular network. The communication may be performed e.g. between two user equipments, between a user equipment and a regular telephone and/or between the user equipment and a server via the Radio Access Network (RAN) and possibly one or more Core Networks (CNs) comprised within the cellular network.

The cellular network covers a geographical area which is divided into cell areas. Each cell area is served by a base station, e.g. a Radio Base Station (RBS), which sometimes may be referred to as e.g. "eNB", "eNodeB", "NodeB", or Base Transceiver Station (BTS), depending on the technology and terminology used. The base stations may be of different classes such as e.g. macro base station, home base station or pico base station, which often is related to transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In the context of this disclosure, a base station as described above will be referred to as a base station or a Radio Base Station (RBS). A user equipment as described above, will in this disclosure be referred to as a user equipment or a UE.

The term downlink (DL) transmission will be used for a transmission from a base station to a user equipment. The term uplink (UL) will be used for a transmission going the opposite direction, i.e. from the user equipment to the base station.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

Cellular communication networks evolve towards higher data rates, together with improved capacity and coverage. In 3GPP, standards for technologies like GSM, HSPA and LTE have been and are currently developed.

In so called Heterogeneous Networks, (HetNets), there is a mix of different cell sizes, realized with different types of node capabilities. Typically, different downlink power levels are used. There are a number of differently sized base stations, which are expected to be deployed with different downlink power levels.

So called macro cells handled by so called macro base stations in the HetNet are sometimes referred to as coverage cells, since they provide coverage over a relatively large area. The macro base stations are sometimes referred to as belonging to a so called macro layer.

Low power base stations, such as micro, pico or femto base stations, as well as relays and repeaters, provide coverage in smaller cells, which may be for example micro, pico and femto cells, in the heterogeneous network. These smaller cells are sometimes referred to as capacity cells. An output power difference between macro sites and micro or pico sites can for example be 10-20 dB, or even more.

In a heterogeneous network deployment with embedded smaller cells, such as micro, pico or femto cells deployed within a large macro cell, the cell borders may be different in downlink and uplink. The reason for this is that the low power base stations as mentioned above typically use a lower output power than the overlaying macro base station, whereas the user equipment power is the same for transmissions to macro base stations and transmissions to low power base stations. In the uplink, it is hence the power capability of the user equipment that is important.

The user equipments served by the low power base stations usually get higher data rates because they are closer to the low power base station than to the macro base station, which results in a better radio link. Also, if fewer users have to share the resources in the macro layer, they can get higher data rates, and there will be more uniform data rates in the system. It is hence important that a significant share of the user equipments are served by the low power base stations in order to offload the macro base stations, since otherwise only the user equipments served by the low power base station reach high data rates.

Within 3GPP Rel. 9, cell selection, i.e. the decision regarding which cell the user equipment should be served by, is based on the power of the respective reference symbols from the choice of cells as measured by the user equipment.

Therefore, the low power base stations have a smaller coverage area, or range, than the macro base stations, due to their relatively low transmit power. Thus, unless there are very strong hotspots, i.e. areas where many user equipments are located, and the low power base stations are placed perfectly in these hotspots, the low power base stations will not be able to absorb a desirable amount of users.

To enable a certain base station, or cell, to serve the desirable amount of user equipments, it may be possible to extend the range of a base station to comprise a so called extended range where user equipments select and are served by the base station, or cell, in question, even if it receives a stronger downlink signal from another base station.

In later releases of LTE, it may for example be possible to extend the range of the small cells by using a cell specific cell selection offset.

By increasing this offset, the low power base station may be favoured in the cell selection procedure, and get to serve more users.

A problem with extended ranges is however that the downlink interference situation may be difficult, since downlink transmissions to user equipments in the extended range may be harmfully interfered by other downlink transmissions. For example, a Physical Downlink Control Channel (PDCCH), which is a downlink channel used for scheduling, transmitted from a low power base station may be severely interfered by downlink transmissions from an overlaying macro base station, particularly when the same frequency, or frequency band, and carrier frequencies are used for the downlink transmissions in the cells served by the low power base station and the cells served by the macro base station.

Functionality for so called time-domain Inter Cell Interference Cancellation (ICIC) comprises a concept called Almost Blank Subframes (ABS), which in this context means that a macro base station will transmit with reduced power and/or activity on some physical resources during certain pre-determined subframes. This way, the low power base station will have some subframes during which interference is low enough for the low power base station to serve its user equipments.

A problem with such solution is, however, that every ABS is a reduction in capacity for the macro base station.

SUMMARY

In view of the discussion above, it is an object for embodiments herein to provide an improved way of handling a downlink transmission.

According to a first aspect, the object is achieved by a method in a first base station for handling a downlink transmission. The first base station serves a first user equipment. The first base station defines a subframe in which the first base station is to avoid interfering a downlink radio channel between a second base station and a second user equipment. The second user equipment is served by the second base station and located in an extended range of the second base station. The extended range is an area in which a downlink signal transmitted from the first base station is stronger than a downlink signal transmitted from the second base station. The first base station performs, in the defined subframe, a downlink transmission to the first user equipment. The first base station receives, from the second base station, an indication of an interference caused by the performed downlink transmission on the downlink radio channel. The first base station adjusts, based on the received indication, a further downlink transmission to be performed by the first base station in a further subframe in which the first base station is to avoid interfering the downlink radio channel.

According to a second aspect, the object is achieved by a first base station for handling a downlink transmission. The first base station serves a first user equipment. The first base station comprises a defining unit. The defining unit is configured to define a subframe in which the first base station is to avoid interfering a downlink radio channel between a second base station and a second user equipment. The second user equipment is served by the second base station and located in an extended range of the second base station. The extended range is an area in which a downlink signal transmitted from the first base station is stronger than a downlink signal transmitted from the second base station. The first base station comprises a transmitter configured to perform, in the defined subframe, a downlink transmission to the first user equipment. The first base station further comprises a receiving unit configured to receive, from the second base station, an indication of an interference caused by the performed downlink transmission on the downlink radio channel. The first base station comprises an adjustment unit configured to adjust, based on the received indication, a further downlink transmission to be performed by the first base station in a further subframe in which the first base station is to avoid interfering the downlink radio channel.

According to a third aspect, the object is achieved by a method in a second base station for assisting a first base station in handling a downlink transmission. The first base station serves a first user equipment. The second base station receives from a second user equipment an interference level information. The second user equipment is served by the second base station and located in an extended range of the second base station. The extended range is an area in which a downlink signal transmitted from the first base station is stronger than a downlink signal transmitted from the second base station. The interference level information is related to a downlink radio channel between the second base station and the second user equipment. The interference level information is further related to a subframe in which the first base station is to avoid interfering the downlink radio channel. The second base station identifies, based on the received interference level information, an indication of an interference on the downlink radio channel. The interference is caused by a downlink transmission from the first base station to the first user equipment.

The second base station sends the indication of the interference to the first base station, thereby assisting the first base station in handling a further downlink transmission to be performed in a further subframe during which interference on the downlink radio channel is to be avoided.

According to a fourth aspect, the object is achieved by a second base station for assisting a first base station in handling a downlink transmission. The base station serves a first user equipment. The second base station comprises a receiver configured to receive from a second user equipment an interference level information. The second user equipment is served by the second base station and located in an extended range of the second base station. The extended range is an area in which a downlink signal transmitted from the first base station is stronger than a downlink signal transmitted from the second base station. The interference level information is related to a downlink radio channel between the second base station and the second user equipment. The interference level information is further related to a subframe in which the first base station is to avoid interfering the downlink radio channel. The second base station comprises an identification unit configured to identify an indication of an interference on the downlink radio channel based on the received interference level information. The interference is caused by a downlink transmission from the first base station to the first user equipment. The second base station comprises a sending unit configured to send the indication of the interference to the first base station the indication of the interference, thereby assisting the first base station in handling a further downlink transmission to be performed in a further subframe during which interference on the downlink radio channel is to be avoided.

Thanks to the first base station performing the downlink transmission in the defined subframe, such as for example an ABS, when it is to avoid interfering downlink transmission to user equipments in the extended range, and being provided with the indication of the interference that the performed transmission caused on the downlink radio channel in the extended range, the first base station can adjust the further transmission to be performed in a further such defined subframe, based on how interfered the downlink radio channel was by the first transmission.

Hence, embodiments herein enables the first base station to make use of such defined, or selected, subframes for downlink transmissions, while still avoiding harmful interference on downlink radio channels within the extended range of the second base station. This increases the overall capacity of the cellular network, and hence provides an improved way of handling a downlink transmission.

DETAILED DESCRIPTION

Figure 1:
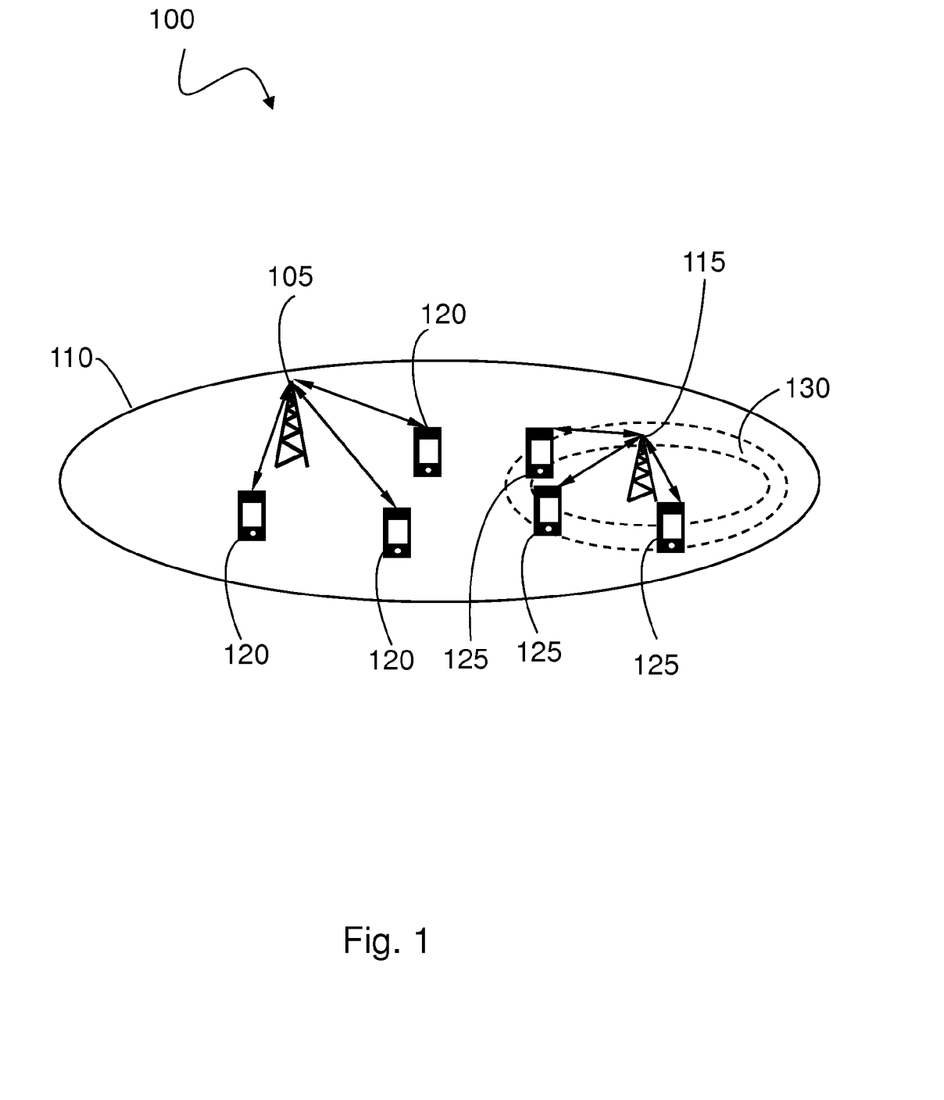
FIG. 1 is a schematic block diagram illustrating an embodiment of a cellular network.

FIG. 1 depicts a cellular network 100. The cellular network 100 may be an LTE cellular network, a WCDMA cellular network, a GSM cellular network, any 3GPP cellular network, or a cellular network comprising and supporting a combination of different radio access technologies such as for example LTE, WCDMA and GSM, or any other cellular network.

The cellular network 100 comprises a first base station 105. The first base station serves a first cell 110. The cellular network 100 further comprises a second base station 115.

The first base station 105 and the second base station 115 may be of different types and may be referred to by different names such as for example eNB, RBS, eNodeB, NodeB or BTS, depending on the technology and terminology used.

The first base station 105 serves a first user equipment 120, which in this example is represented by three first user equipments 120 located in the first cell 110.

The second base station 115 serves a second user equipment 125, which in this example is represented by three second user equipments 125.

The second user equipments 125 are located in a so called extended range 130 of the second base station 115. The extended range 130 is an area where the second user equipments 125 experience a higher downlink signal strength from the first base station 105 than from the second base station 115, while still being served by the second base station 115 due to a biased cell selection.

When cell selection is based on estimated channel quality of candidate cells, the biased cell selection may hence for example be achieved by improving an estimated channel quality for a certain cell by a certain number of decibels, corresponding to an offset, to make it more likely that that particular cell is selected. In this example, such a cell selection offset may be used to bias the cell selection in favour of the second base station 115, so that the second user equipments 125 become served by the second base station 115 when in the extended range 130.

The first user equipments 120 and the second user equipments 125 may be for example communication devices such as a mobile telephones, cellular telephones, laptops, or a tablet computers, sometimes referred to as a surf plates, with wireless capability. The user equipments 125 may be portable, pocket-storable, hand-held, computer-comprised, or vehicle-mounted mobile devices, enabled to communicate voice and/or data with another entity, such as another mobile station or a server, via the cellular network 100.

The cellular network 100 is in this example a so called heterogenous network (HetNet), wherein the first base station 105 is a macro base station with a higher output power than the second base station 115 which is a micro base station, or low power base station. The difference in output power between the first base station 105 and the second base station 115 may be in the range of 20-30 dB, with the first base station 105 having the highest output power of the two.

In another embodiment, the first base station 105 and the second base station 115 may have essentially the same output power. The extended range of the second base station 115 may then be due to a traffic situation requiring that the second base station 115 serves more users for a satisfactory quality of service in the cellular network 100.

It is to be understood that FIG. 1 is merely a schematic illustration, and that the cellular network 100 may in reality comprise several further base stations, user equipments and other radio network nodes which are not shown in FIG. 1.

Figure 2:
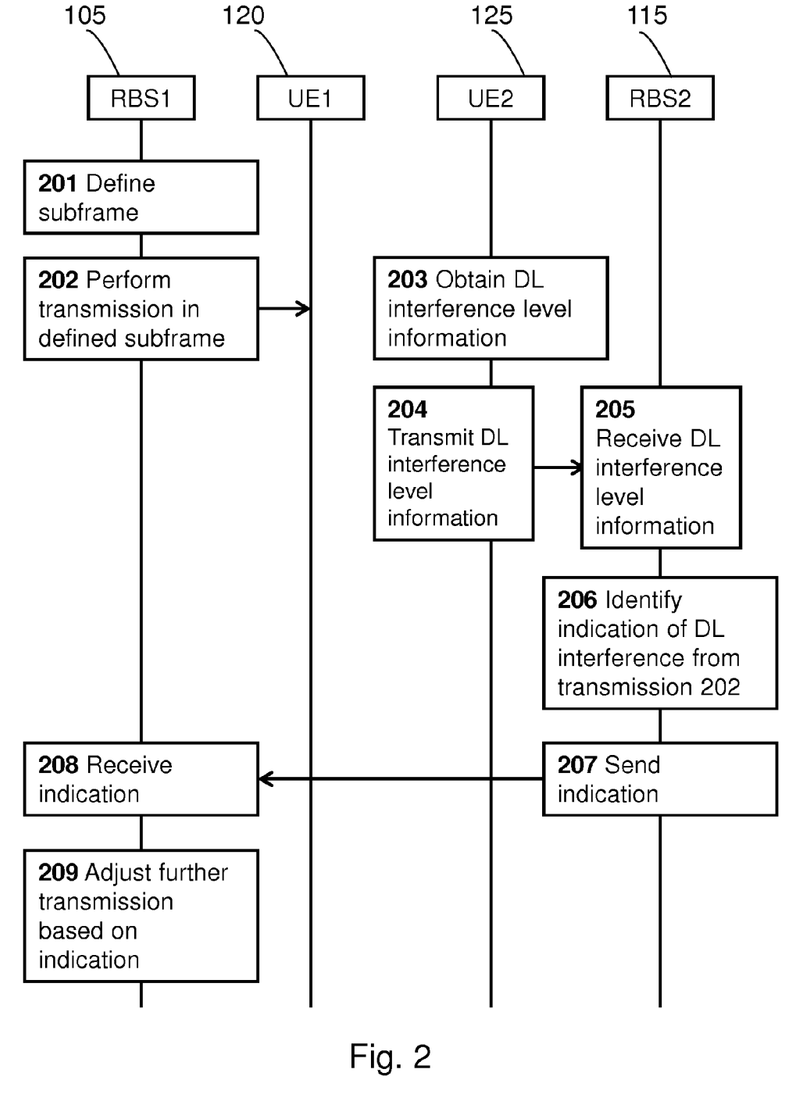
FIG. 2 is a combined signalling scheme and flowchart illustrating embodiments in a cellular network.

FIG. 2 illustrates how a method for handling a downlink transmission may be implemented in the cellular network 100 depicted in FIG. 1, according to some embodiments herein.

In action 201, the first base station 105 defines, or selects, one or more subframe during which it is to avoid interfering downlink radio channels between the second base station 115 and the second user second equipments 125 in the extended range 130. The selected subframes may be for example ABSs, or other subframes with high requirement on interference reduction. Such subframes may be necessary to guarantee a satisfactory quality of service to the second user equipments 125 being located in the extended range 130 where they are likely to be harmfully interfered by downlink signals from the first base station 105, since these signals are strong in the extended range 130. This may be the case for example when the first base station 105 and the second base station 115 use the same frequency band for their respective downlink transmissions.

The one or more defined subframes in which the first base station 105 is to avoid interfering downlink transmissions performed by the second base station 115 to the second user equipments 125 in the extended range 130, may be determined within the cellular network 100, and possibly updated over time, and known in advance by both the first base station 105 and the second base station 115.

In action 202, the first base station 105 performs a downlink transmission in the defined subframe. The downlink transmission may be performed in several defined subframes if more than one subframe has been defined, or selected, for this purpose in action 201.

The downlink transmission may be represented by one or more downlink transmission to one or more of the first user equipments 120.

The downlink transmission may be performed on a physical downlink shared channel and be a data transmission. This may be advantageous, since interference on a radio channel which is for data transmissions is less harmful, than interference on a control channel, such as PDCCH. The reason for this is that there is more robustness in the form of fast retransmissions using Hybrid Automatic Repeat Request (HARQ) functionality for data transmissions, than for control transmissions such as scheduling.

In action 203, one or more of the second user equipments 125 obtains interference level information related to the defined subframe, or subframes, in which the first base station 105 performed its downlink transmission in action 202.

As previously mentioned, the defined subframe, or subframes, in question may be ABSs.

The interference level information may be for example Channel State Information (CSI) comprising Channel Quality Indicator (CQI) measurements performed by the second user equipments 125.

Regular channel state information reported by the second user equipments 125 may comprise a frequency selective CQI. The CQI depends on interference from other cells but also frequency and time selective characteristics of the channel.

The second user equipments 125 may measure downlink interference in specific resource blocks and report this.

The interference level information obtained by the second user equipments 125 may hence be for example CQI measurements which are normally transmitted in measurement reports to the serving base station, i.e. the second base station 115 in this example, on a regular basis.

The interference level information may be obtained by the second user equipment 125 over several subframes, among which only one or some are the defined subframes in question here, before being reported to the second base station 115.

The interference level information may also be in the form of HARQ information, such as the amount of nack/ack sent from the second user equipments 125 in relation to downlink transmissions performed from the second base station 115 in the defined subframe, or subframes, in question.

The second user equipments 125 in the extended range 130 may be configured with different suitable measurement patterns to avoid mixing measurements performed in the defined subframe with other subframes in which the first base station is not to avoid interfering. Otherwise, the measurements may risk giving very poor channel estimates.

For example, due to almost blank subframes, ABSs, interference may vary significantly from subframe to subframe for the second user equipments 125, since the interference will likely be high in non-ABSs, and low in ABSs.

Hence, if the defined subframes are ABSs, one or more of the second user equipments 125 may in certain situations only be scheduled during ABSs by the second base station 115, due to the otherwise high interference.

Thus, including non-ABS subframes in Channel Quality Indicator (CQI) measurements and reports may be unnecessary, and sometimes even wrong, as the measured interference will likely be higher than the user equipment would actually experience if scheduled only during ABSs. To exclude subframes from measurements, there may be a feature called measurement restrictions. The second base station 115 may then signal to the second user equipments 125 which subframes to comprise in some measurements such as CQI.

Further interference level information may be an offset between a signal from the first base station 105 and a signal from the second base station 115 that one of the second user equipments 125 experiences.

In action 204, one or more of the second user equipments 125 transmit the interference level information to the second base station 115.

In action 205, the second base station 115 receives the interference level information from one or more of the second user equipments 125.

In action 206, the second base station 115 uses the received interference level information to identify an indication of an interference caused by the one or more downlink transmissions performed in the defined subframes by the first base station 105 in action 202. This may be done for example by selecting CQI measurements from the relevant subframes.

To find resource blocks with high interference from CQI reporting which is also averaged over time, may be possible by combining the information from several second user equipments 125. Thus, if several of these report poor channel quality on resource block x to x+n, this may be comprised in the indication of interference.

When the indication of the interference is sent to the first base station 105, as will be described below in relation to action 207, the information of which resource blocks where most interfered may be important to help the first base station 105 adjust its further transmissions to reduce the interference. This will be further explained in relation to action 209 below.

Measurement restrictions, if set on the second user equipments 125 for example as previously described, may need to be considered in the combination of CQI reports.

In some embodiments, the interference level information may, as previously mentioned, comprise HARQ information such as the amount of acks/nacks received from the second user equipments 125 in relation to downlink transmissions performed from the second base station 115 in the defined subframes in question.

For example, if the first base station 105 has allocated too much power to its downlink transmissions performed in action 202 in the defined subframe, or has used an unfortunate precoder, and this causes harmful interference on the downlink radio channels between the second user equipments 125 and the second base station 115, then the second base station 115 may detect this because of failed downlink transmissions to the second user equipments 125.

In some embodiments, HARQ ack/nack statistics for different specific resource blocks in the defined subframe or subframes in question may be used when identifying the indication or the interference. For example, statistics related to resource blocks, on which especially the user second equipments 125 in the extended range 130 were scheduled, may be used.

In some embodiments the indication of the interference comprises HARQ ack/nack information, resource block information and an anonymous user equipment identifier for one or more of the second user equipments 120.

The anonymous user equipment identifier is a selected number that makes it possible for the first base station 105, i.e. the macro base station in this example, to determine if more than one second user equipment 125 has sent nacks or reported a bad CQI, while the identity of the second user equipments 125 are protected.

The user equipment identifier may be used to distinguish between a retransmission not triggered by the downlink transmission performed by the first base station in action 202, and a retransmission caused by this transmission.

For example, if two of the three second user equipments 125 successfully received their downlink transmissions in the defined subframe, whereas the third one failed, it is likely that the downlink transmission from the first base station 105 was not the main reason for the failed downlink transmission to one of the second user equipments 125, since all three second user equipments 125 are located in the extended range 130.

Further interference level information may as previously mentioned, be an offset between a downlink signal from the first base station 105 and a downlink signal from the second base station 115 that one of the second user equipments 125 experiences. If this reported offset indicates that the second user equipment 125 in question is close to the handover threshold to the first base station 105, this particular second user equipment 125 may likely be particularly sensitive to interference from the first base station 105.

The interference level information may be aggregated and analysed statistically by the second base station 115 to improve the accuracy of the indication of the interference.

In action 207, the second base station 115 sends the in action 206 identified indication of the interference to the first base station 105. The sending may be performed over wireline.

In action 208, the first base station 105 receives the indication of the interference from the second base station 115.

In action 209, the first base station 105 adjusts one or more further downlink transmissions which are to be performed in one or more further, i.e. upcoming, subframes in which the first base station 105 is also to avoid interfering, such as for example ABSs.

When the indication of the interference received in action 208 is that the one or more downlink transmissions performed in action 202 caused too much interference on one or more of the downlink radio channels in the extended range 130, the adjustment may be performed to reduce the interference.

On the other hand, if the indication of the interference is that there was no identified harmful interference to any downlink transmissions in the extended range 130, then the adjustment may be to allow stronger further downlink transmissions by the first base station 105, or the adjustment may be to perform more downlink transmissions from the first base station 105 in the further subframes, to better make use of the subframes in question. This may be the case for example if no second user equipment 125 is located in the extended range 130.

The adjustment may be performed by adjusting the power, or excluding one or more of the first user equipments 120 and/or a certain precoder or precoders in the further, or upcoming, transmissions in the further subframes.

Precoder and power statistics for the downlink transmissions performed during several defined subframes may be collected by the first base station 105, as well as information related to failed/non-failed transmissions. The first base station 105 may or may not aggregate the precoders used for the downlink transmissions depending on how granular the interference indications from the second base station 115 are.

If a certain precoder power combination causes a lot of retransmissions it should not be used during the further subframes.

Alternatively, a gradual exclusion may be used, wherein the power to be used for the further downlink transmission to one of the first user equipments 120 is coupled to an interference ranking of that first user equipment 120 corresponding to the precoder of that first equipment 120. Information may be aggregated over time. Thus, if an indication of the interference has been received that several times point out the same first user equipment 120, this particular first user equipment 120 will have a corresponding increase in its interference ranking. If a reduction of power does not help, this may eventually lead to exclusion of further transmissions to that first user equipment 120 when the power is too low to give the first user equipment 120 in question sufficient quality.

The first base station 105 may use information of which resource blocks were most interfered, together with the known precoder used in these resource blocks, in order to deduce which combination of first user equipments 120 and precoders cause high interference in the extended range 130. This knowledge may be used when performing the adjustment.

For example, as described above in relation to action 206, if several second user equipments 125 in the extended range 130 report poor channel quality on specific resource blocks, such as resource block x to x+n, this information may be included in the indication of interference sent from the second base station 115.

The first base station 105 may then use this information in the adjustment by identifying which first user equipments 120 were scheduled in these resource blocks in the in action 202 performed transmission. One or more of the identified first user equipments 120 may then be removed from scheduling in the further subframe, or alternatively, the adjustment may be used to reduce the power used for further downlink transmissions to these particular first user equipments 120.

Beamforming is special case of precoding. The term beamforming is taken to mean a component of a transmission scheme and antenna setup that intentionally strives to form at least one localized beam in the physical space. Depending on the antenna configuration, this beam may be more or less narrow, and thus reduce interference to user equipments in other directions.

However, using the direction to the location of the first user equipment 120 and merely adjusting the further transmission by performing beamforming is not possible for all antenna configurations and may not be sufficient to reduce interference, since radio waves do not propagate in the main direction. The propagation environment may cause energy to spread in several directions through interaction with objects in the radio channel. Therefore, two precoders that may appear to focus the energy in a similar direction may give rise to large differences in signal strength and interference.

Thanks to embodiments herein, defined subframes in which the first base station 105 is to avoid interfering downlink transmissions in the extended range 130 of the second base station 115, can still be used for downlink transmissions by the first base station 105, since harmful interference can be adjusted for, and hence avoided, in further transmissions.

Figure 3:
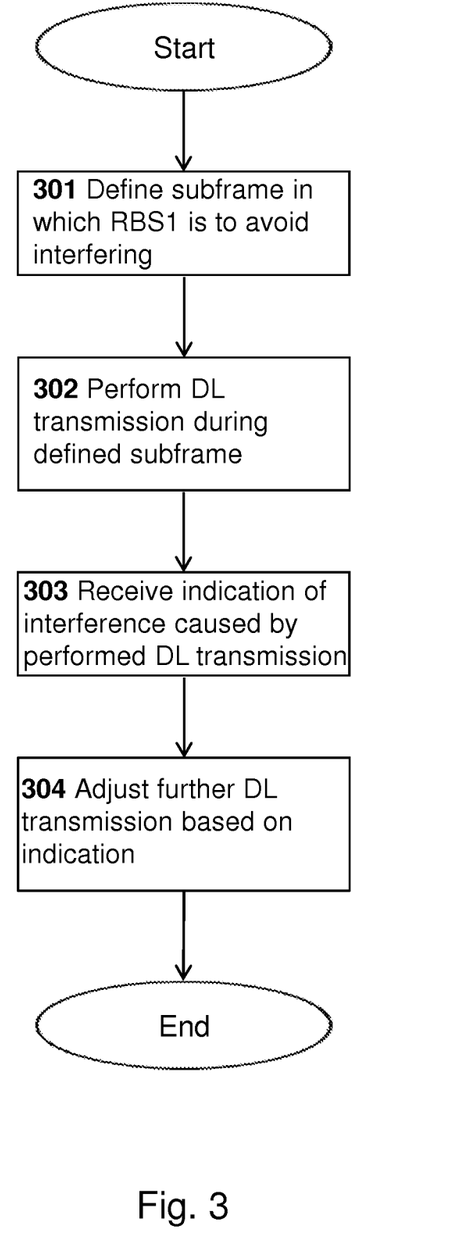
FIG. 3 is a flowchart illustrating embodiments of a method in a first base station.

Embodiments herein, relating to a method in the first base station 105 for handling a downlink transmission, will now be further elaborated and described with reference to the flowchart depicted in FIG. 3. These embodiments will be described in a more general way. As previously mentioned, the first base station 105 serves the first user equipment 120.

The first base station 105 and the first user equipment 120 may be of any of the previously described types. In some embodiments, the first base station 105 is a macro base station.

The method comprises the following actions, which actions may be taken in any suitable order.

In action 301 the first base station 105 defines a subframe in which the first base station 105 is to avoid interfering a downlink radio channel between the second base station 115 and the second user equipment 125. The second user equipment 125 is served by the second base station 115 and located in the extended range 130 of the second base station 115. The extended range 130 is an area in which a downlink signal transmitted from the first base station 105 is stronger than a downlink signal transmitted from the second base station 115.

The second base station 115 and the second user equipment 125 may be of any of the previously described types. In some embodiments, the second base station 115 is a low power base station.

In some embodiments, the defined subframe is an almost blank subframe. Almost blank subframes are subframes with no or reduced transmit power on a physical channel and/or subframes with reduced activity.

Action 302

In this action, the first base station 105 performs a downlink transmission to the first user equipment 120. The downlink transmission is performed in the in action 301 defined subframe.

The downlink transmission may be performed in any of the in relation to FIG. 2 described ways.

In some embodiments, the first user equipment 120 is represented by more than one user equipment 120.

The downlink transmission may be represented by more than one downlink transmission performed to one or more first user equipment 120.

In some embodiments, the first downlink transmission is transmitted on a physical downlink shared channel.

Action 303

In this action, the first base station 105 receives from the second base station 115 an indication of an interference caused by the in action 302 performed downlink transmission. The interference is caused on the downlink radio channel between the second base station 115 and the second user equipment 125.

The indication may be received by wireline or by an air interface from the second base station 115.

In some embodiments, the indication of the interference is based on, and/or comprises, channel state information related to the radio channel, and/or Hybrid Automatic Repeat Request, HARQ, information related to the radio channel.

In some embodiments, the indication of the interference comprises and/or is based on an interference estimate. For example, there may in the user equipments be a receiver algorithm that attempts to cancel interference from other transmissions on the same resource blocks as the desired transmission to facilitate decoding of the data. From this process an interference estimate may be obtained.

Channel state information may comprise rank indication, a quantified channel quality, or CQI reports, a preferred precoder, or Precoding Matrix Indicator (PMI), explicit channel characteristics, estimated interference, etc.

In action 304 the first base station 105 adjusts a further downlink transmission to be performed by the first base station 105. The adjustment is based on the in action 303 received indication of the interference. The further downlink transmission is to be performed in a further subframe. The further subframe is also a subframe in which the first base station 105 is to avoid interfering the downlink radio channel.

The adjustment may be performed in any of the in relation to FIG. 2 described ways.

The adjustment may, as previously mentioned, be performed to reduce the interference when the indication of the interference is that the interference caused by the downlink transmission performed in action 302 was too high.

Alternatively, the adjustment may, as also previously mentioned, be performed to perform more and/or stronger downlink transmissions to one or more of the first user equipments 120 if the indication of the interference is that the interference caused by the downlink transmission performed in action 302 was not harmful.

In some embodiments, when the first user equipment 120 is represented by more than one user equipment 120, the adjusting may be performed by adjusting the further transmission to be performed to another one of the more than one first user equipments than the performed transmission. This may be performed in any of the in relation to FIG. 2 described ways, for example by excluding a certain first user equipment 120 from scheduling.

In some embodiments, the adjusting is performed by adjusting an output power level to be used for the further downlink transmission and/or by adjusting a precoder to be used for the further downlink transmission. This may also be performed in any of the in relation to FIG. 2 described ways.

In some embodiments, the further transmission is to be performed on a physical downlink shared channel.

In some embodiments, the further subframe is an almost blank subframe.

Figure 4:
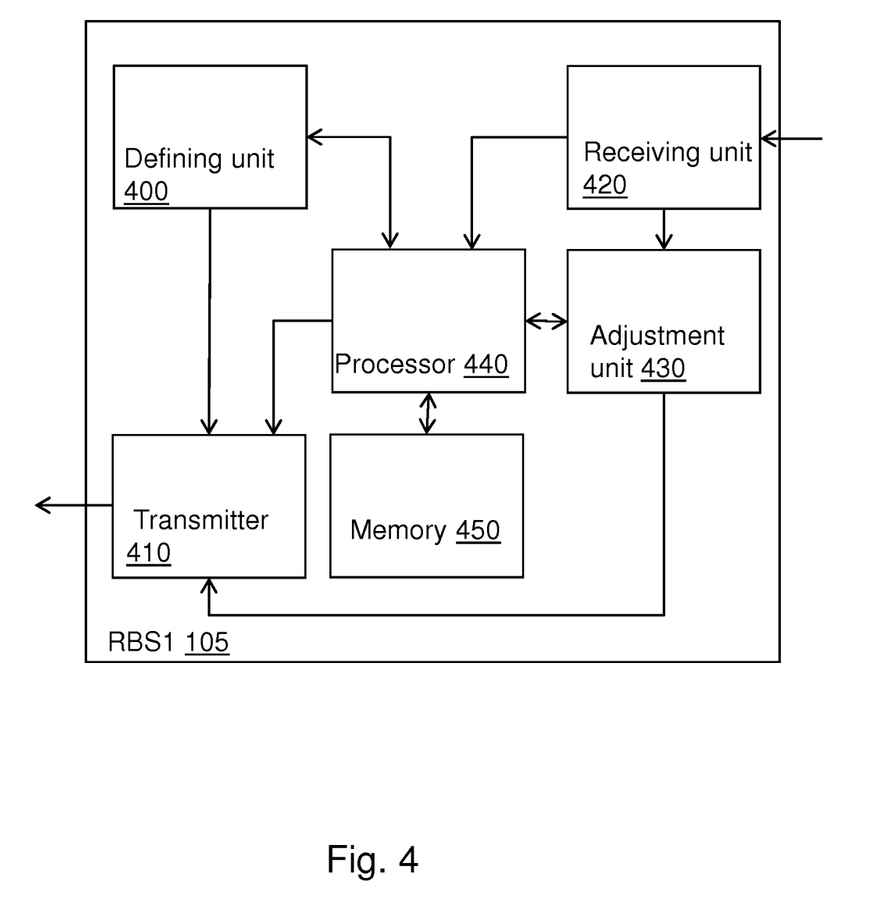
FIG. 4 is a block diagram illustrating embodiments of a first base station.

To perform the actions above for handling a downlink transmission, the first base station 105 comprises an arrangement schematically depicted in FIG. 4. As mentioned above, the first base station 105 serves a first user equipment 120.

The first base station 105 and the first user equipment 120 may be of any of the previously described types.

In some embodiments, the first base station 105 is a macro base station.

The first base station 105 comprises a defining unit 400. The defining unit 400 is configured to define a subframe in which the first base station 105 is to avoid interfering a downlink radio channel between the second base station 115 and the second user equipment 125. The second user equipment 125 is served by the second base station 115 and located in an extended range 130 of the second base station 115. The extended range 130 is an area in which a downlink signal transmitted from the first base station 105 is stronger than a downlink signal transmitted from the second base station 115.

The second base station 115 and the second user equipment 125 may be of any of the previously described types. In some embodiments, the first base station 105 is a macro base station.

In some embodiments, the defined subframe is an almost blank subframe.

The first base station 105 comprises a transmitter 410, configured to perform, in the defined subframe, a downlink transmission to the first user equipment 120.

The transmitter may be further configured to perform the downlink transmission on a physical downlink shared channel.

The first base station 105 comprises a receiving unit 420. The receiving unit 420 is configured to receive, from the second base station 115, an indication of an interference caused by the first downlink transmission on the radio channel.

In some embodiments, the indication of the interference is based on, and/or comprises, channel state information related to the radio channel, and/or on Hybrid Automatic Repeat Request, HARQ, information related to the radio channel.

In some embodiments, the indication of the interference comprises and/or is based on an interference estimate. For example, there may in the user equipments be a receiver algorithm that attempts to cancel interference from other transmissions on the same resource blocks as the desired transmission to facilitate decoding of the data. From this process an interference estimate may be obtained.

The receiving unit 420 may be configured to receive the indication of the interference over wireline, or over the air interface.

The first base station 105 comprises an adjustment unit 430. The adjustment unit 430 is configured to adjust, based on the received indication, a further downlink transmission to be performed by the first base station 105 in a further subframe in which the first base station 105 is to avoid interfering the downlink radio channel.

The adjustment unit 430 may be configured to perform the adjustment according to any of the in relation to FIG. 2 described ways.

In some embodiments, when the first user equipment 120 is represented by more than one user equipment 120, the adjustment unit 430 is further configured to perform the adjustment by adjusting the further transmission to be performed to another one of the more than one first user equipments than the performed transmission.

In some embodiments, the adjustment unit 430 is further configured to perform the adjustment by adjusting an output power level to be used for the further downlink transmission, and/or by adjusting a precoder to be used for the further downlink transmission.

The embodiments of the first base station 105 for handling a downlink transmission may be implemented through one or more processors, such as a processor 440 in the first base station 105 depicted in FIG. 4, together with computer program code for performing the actions of embodiments herein.

The program code mentioned above may also be provided as a computer program product, for instance in the form of a data carrier carrying computer program code for performing the embodiments herein when being loaded into the first base station 105.

One such carrier may be in the form of a CD ROM disc. It is however feasible with other data carriers such as a memory stick. The computer program code may furthermore be provided as pure program code on a server and downloaded to the first base station 105 e.g. remotely.

The first base station 105 may further comprise a memory 450 comprising one or more memory units. The memory 450 is arranged to be used to store data such as for example the indication of the interference, the channel state information, the HARQ information, the identity of one or more user equipment 120 and/or information about the allocated power and/or precoder used for one or more performed downlink transmission. The memory 450 may further be arranged to store applications to perform the actions of the embodiments herein when being executed in the first base station 105.

Figure 5:
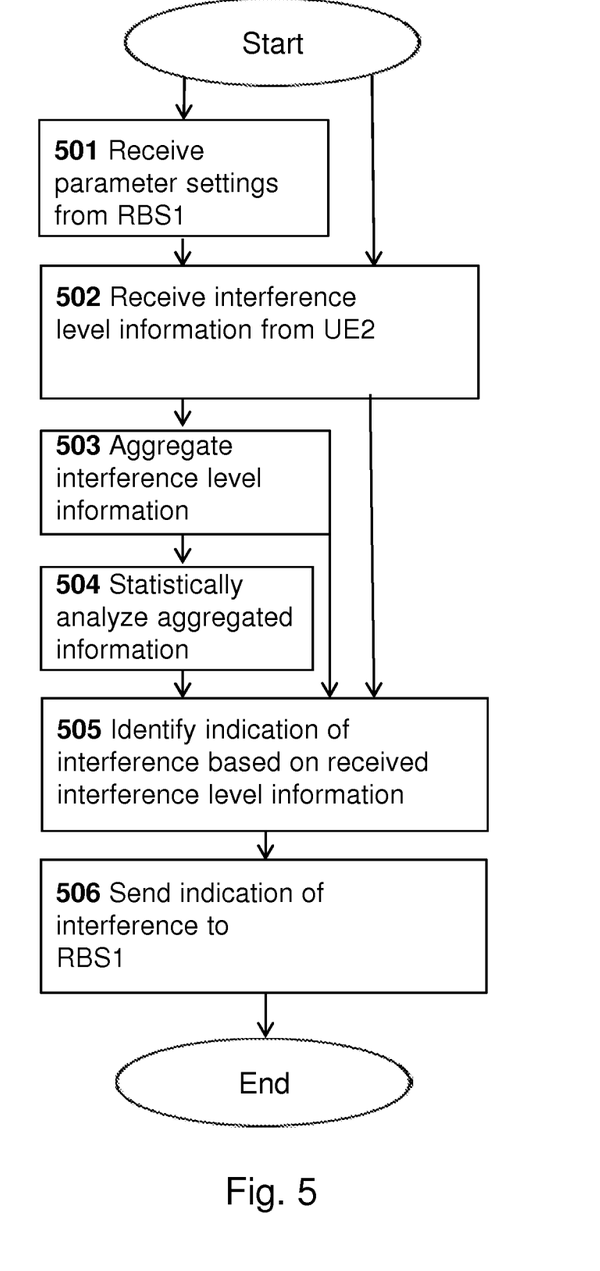
FIG. 5 is a flowchart illustrating embodiments of a method in a second base station.

Embodiments herein, relating to a method in the second base station 115 for assisting the first base station 105 in handling a downlink transmission will now be further elaborated and described with reference to the flowchart depicted in FIG. 5. These embodiments will also be described in a more general way.

As previously mentioned, the first base station 105 serves the first user equipment 120. The first base station 105 and the first user equipment 120 may be of any of the previously described types. In some embodiments, the first base station 105 is a macro base station.

The method comprises the following actions, which actions may be taken in any suitable order.

Action 501

This is an optional action, according to which the second base station 115 receives from the first base station 105, RBS1, parameter settings used by the first base station 105 for a downlink transmission.

The parameter settings may be for example resource block information, and/or power information and/or precoder information.

The parameter settings may be related to downlink transmissions performed in one of more defined subframe in which the first base station 105 is to avoid interfering a downlink radio channel between the second base station 115 and the second user equipment 125, which second user equipment 125 is served by the second base station 115 and located in the extended range 130 of the second base station 115.

Action 502

In this action, the second base station 115 receives an interference level information from the second user equipment 125, UE2. The second user equipment 125 is served by the second base station 125 and located in an extended range 130 of the second base station 115. The extended range 130 is an area in which a downlink signal transmitted from the first base station 105 is stronger than a downlink signal transmitted from the second base station 115. The interference level information is related to a downlink radio channel between the second base station 115 and the second user equipment 125. The interference level information is further related to a subframe in which the first base station 105 is to avoid interfering the downlink radio channel.

In some embodiments, this subframe is an almost blank subframe.

In some embodiments, the interference level information comprises channel quality measurement, CQI, information related to the radio channel, and/or Hybrid Automatic Repeat Request, HARQ, information related to the radio channel.

In some embodiments, the indication of the interference comprises and/or is based on an interference estimate. For example, there may in the user equipments be a receiver algorithm that attempts to cancel interference from other transmissions on the same resource blocks as the desired transmission to facilitate decoding of the data. From this process an interference estimate may be obtained.

Action 503

This is an optional action, according to which the second base station aggregates interference level information. The aggregated interference level information may be related to more than one subframe during which the first base station 115 is to avoid interfering, such as for example almost blank subframes. The aggregated interference level information may be related to one or more second user equipment 125.

Action 504

In this action, which also is optional, the second base station 115 statistically analyses the aggregated interference level information.

In some embodiments, when the optional action 501 has been performed, the statistical analysis is further based on the parameter settings.

Action 505

In this action, the second base station 115 identifies based on the received interference level information an indication of an interference caused by the downlink transmission from the first base station 105 to the first user equipment 120.

In some embodiments, when the optional action 503 has been performed, the indication of the interference may be further be based on the aggregated interference level information.

In some embodiments, when the optional action 504 has been performed, the indication of the interference may further be based on the result of the statistical analysis.

Action 506

In this action, the second base station 115 sends to the first base station 105 the indication of the interference caused by the downlink transmission. Thereby the second base station assists the first base station 105 in handling a further downlink transmission to be performed during a further subframe during which interference on the radio channel is to be avoided. The sending may be performed over wireline or wireless, for example using X2 signalling.

Figure 6:
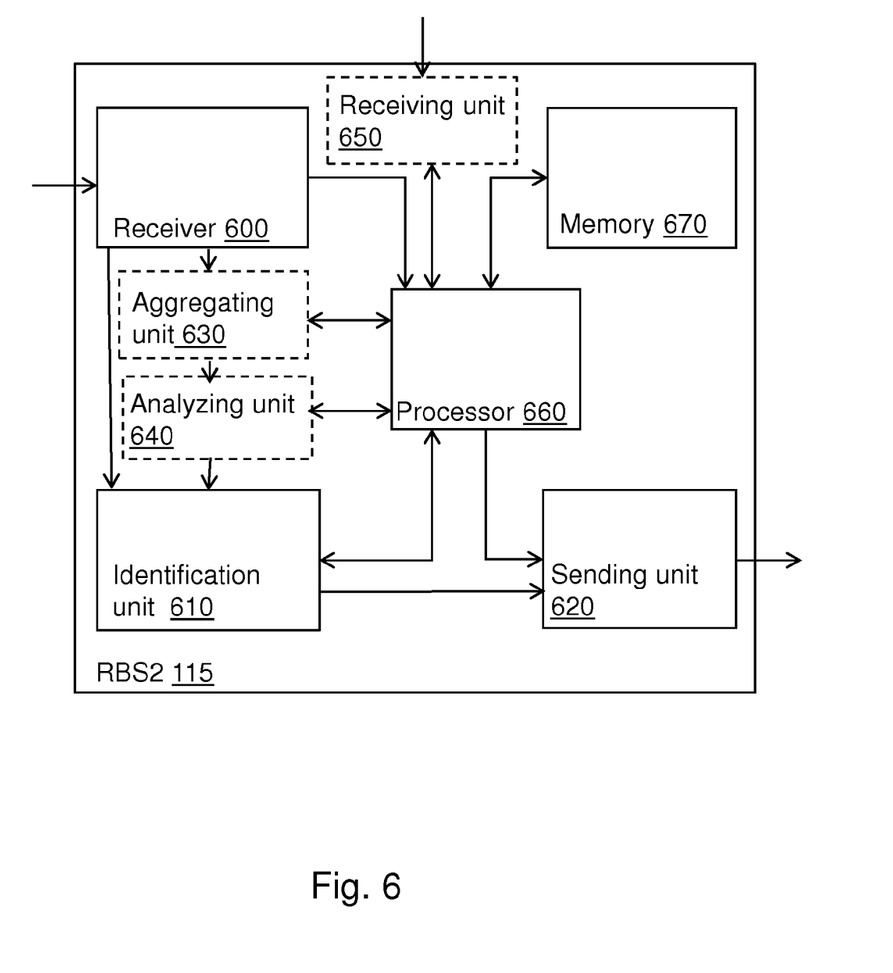
FIG. 6 is a block diagram illustrating embodiments of a second base station.

To perform the actions above for assisting the first base station 105 in handling a downlink transmission, the second base station 115 comprises an arrangement schematically depicted in FIG. 6.

The second base station 115 may be of any of the previously described types.

As previously mentioned, the first base station 105 serves a first user equipment 120.

The second base station 115 comprises a receiver 600. The receiver 600 is configured to receive from a second user equipment 125 an interference level information. The second user equipment 125 is served by the second base station 125 and located in an extended range 130 of the second base station 115. The extended range 130 is an area in which a downlink signal transmitted from the first base station 105 is stronger than a downlink signal transmitted from the second base station 115. The interference level information is related to a downlink radio channel between the second base station 115 and the second user equipment 125. The interference level information is further related to a subframe in which the first base station 105 is to avoid interfering the downlink radio channel.

According to some embodiments, the interference level information comprises channel quality measurement, CQI, information related to the radio channel, and/or Hybrid Automatic Repeat Request, HARQ, information related to the radio channel.

In some embodiments, the indication of the interference comprises and/or is based on an interference estimate. For example, there may in the user equipments be a receiver algorithm that attempts to cancel interference from other transmissions on the same resource blocks as the desired transmission to facilitate decoding of the data. From this process an interference estimate may be obtained.

The second base station 115 further comprises an identification unit 610. The identification unit is configured to identify, based on the received interference level information, the indication of an interference caused by the downlink transmission from the first base station 105 to the first user equipment 120.

The second base station 115 further comprises a sending unit 620. The sending unit 620 is configured to send to the first base station 105 the indication of the interference caused by the downlink transmission, thereby assisting the first base station 105 in handling a further downlink transmission to be performed during a further subframe in which interference on the radio channel is to be avoided. The sending may be performed over wireline or wireless, for example using X2 signalling.

According to some embodiments, the second base station 115 further comprises an aggregating unit 630, configured to aggregate interference level information. The aggregated interference level information may be related to more than one subframe in which interference is to be avoided, and/or related to more than one second user equipment 125. The indication of the interference may then further be based on the aggregated information.

According to some embodiments, the second base station 115 further comprises an analysing unit 640 configured to statistically analyse the aggregated information.

The indication of the interference may then further be based on the result of the statistical analysis.

According to some embodiments, the second base station 115 further comprises a receiving unit 650. The receiving unit 640 is configured to receive parameter settings used by the first base station 105 for the downlink transmission. The statistical analysis may then further be based on the parameter settings.

The embodiments of the second base station 115 may be implemented through one or more processors, such as a processor 660 in the second base station 115 depicted in FIG. 6, together with computer program code for performing the actions of embodiments herein.

The program code mentioned above may also be provided as a computer program product, for instance in the form of a data carrier carrying computer program code for performing the embodiments herein when being loaded into the second base station 115.

One such carrier may be in the form of a CD ROM disc. It is however feasible with other data carriers such as a memory stick. The computer program code may furthermore be provided as pure program code on a server and downloaded to the second base station e.g. remotely.

The second base station 115 may further comprise a memory 670 comprising one or more memory units. The memory 670 is arranged to be used to store data such as for example the interference level information and/or the indication of the interference, and/or CQI information, and/or HARQ information. It may further be arranged to store applications to perform the actions of the embodiments herein when being executed in the second base station 115.

When using the word "comprise" or "comprising" it shall be interpreted as non-limiting, i.e. meaning "consist at least of".

The term "configured to" used herein may also be referred to as "arranged to".

Embodiments herein make it possible to use ABS subframes for macro base station transmission by providing methods for detecting harmful interference and thus introducing robustness. Since the first base station 120 is able to perform downlink transmissions during the defined subframes in which interference to the second base station downlink transmissions is to be reduced and/or avoided, such as for example during ABSs, capacity can be increased in a macro cell where usually most of the user equipments are. It is further possible to do a proprietary implementation which would create a tighter connection between low power nodes such as picos and the macro layer.

As previously mentioned, in some versions of LTE there may be functionality for time-domain ICIC. This functionality comprises the concept Almost Blank Subframes (ABS) which in this context means that a macro eNB will transmit with reduced power and/or activity on some physical resources during certain pre-determined subframes. This way the interfered users in a neighbor pico cell will have some subframes during which the interference is low enough for the pico eNB to serve them.

Thanks to embodiments herein, it is possible for the macro eNB to make unicast data downlink transmissions during ABS, while still avoiding harmfully interfering an extended range of such a pico cell.

The current Cell Reference Symbol CRS based Physical PDCCH channel used for scheduling cannot be beamformed but the power can be reduced to cause less interference. When intra-subframe scheduling is used, the scheduling information sent over the PDCCH is only valid for the Physical Downlink Shared Channel (PDSCH) in the same subframe.

With so-called inter-subframe scheduling, a PDCCH comprises scheduling information for PDSCH in successive subframes. Such a solution may facilitate macro transmission in the data part of the ABS subframe while respecting the interference requirements from the low power base station.

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a first base station for handling a downlink transmission, which first base station serves a first user equipment, the method comprising:
 defining a subframe in which the first base station is to avoid interfering with a downlink radio channel between a second base station and a second user equipment, which second user equipment is served by the second base station and is located in an extended range of the second base station, which extended range is an area in which a downlink signal transmitted from the first base station is stronger than a downlink signal transmitted from the second base station;
 performing, in the defined subframe, a downlink transmission to the first user equipment;
 receiving from the second base station an indication of an interference caused by the performed downlink transmission on the downlink radio channel; and
 adjusting, based on the received indication, a further downlink transmission to be performed by the first base station in a further subframe in which the first base station is to avoid interfering with the downlink radio channel.

2. The method of claim 1, wherein the defined subframe and the further subframe are almost-blank subframes, which almost-blank subframes are subframes with no or reduced transmit power on a physical channel, or subframes with reduced activity, or both.

3. The method of claim 1, wherein the first base station is a macro base station, and wherein the second base station is a low-power base station.

4. The method of claim 1, wherein the downlink transmission is transmitted on a physical downlink shared channel.

5. The method of claim 1, wherein the indication of the interference is based on channel state information related to the radio channel, or Hybrid Automatic Repeat Request (HARQ) information related to the radio channel, or both.

6. The method of claim 1, wherein the first user equipment is represented by more than one user equipment, and wherein the adjusting is performed by adjusting the further transmission to be performed to another one of the more than one first user equipments than the performed transmission.

7. The method of claim 1, wherein the adjusting is performed by adjusting an output power level to be used for the further downlink transmission, or by adjusting a precoder to be used for the further downlink transmission, or both.

8. A first base station for handling a downlink transmission, which first base station serves a first user equipment, the first base station comprising:
 a defining unit configured to define a subframe in which the first base station is to avoid interfering with a downlink radio channel between a second base station and a second user equipment, which second user equipment is served by the second base station and is located in an extended range of the second base station, which extended range is an area in which a downlink signal transmitted from the first base station is stronger than a downlink signal transmitted from the second base station;
 a transmitter configured to perform, in the defined subframe, a downlink transmission to the first user equipment;
 a receiving unit configured to receive, from the second base station, an indication of an interference caused by the performed downlink transmission on the downlink radio channel; and
 an adjustment unit, configured to adjust, based on the received indication, a further downlink transmission to be performed by the first base station in a further subframe in which the first base station is to avoid interfering with the downlink radio channel.

9. The first base station of claim 8, wherein the defined subframe and the further subframe are almost-blank subframes, which almost-blank subframes are subframes with no or reduced transmit power on a physical channel or subframes with reduced activity, or both.

10. The first base station of claim 8, wherein the first base station is a macro base station, and wherein the second base station is a low power base station.

11. The first base station of claim 8, wherein the transmitter is further configured to perform the downlink transmission on a physical downlink shared channel.

12. The first base station of claim 8, wherein the indication of the interference is based on channel state information related to the radio channel, or Hybrid Automatic Repeat Request (HARQ) information related to the radio channel.

13. The first base station of claim 8, wherein the first user equipment is represented by more than one user equipment, and wherein the adjustment unit is further configured to perform the adjustment by adjusting the further transmission to be performed to another one of the more than one first user equipments than the performed transmission.

14. The first base station of claim 8, wherein the adjustment unit is further configured to perform the adjustment by adjusting an output power level to be used for the further downlink transmission, or by adjusting a precoder to be used for the further downlink transmission, or both.

15. A method in a second base station for assisting a first base station in handling a downlink transmission, which first base station serves a first user equipment, the method comprising:
 receiving from a second user equipment an interference level information, which second user equipment is served by the second base station and located in an extended range of the second base station, which extended range is an area in which a downlink signal transmitted from the first base station is stronger than a downlink signal transmitted from the second base station, which interference level information is related to a downlink radio channel between the second base station and the second user equipment, and which interference level information is further related to a subframe in which the first base station is to avoid interfering the downlink radio channel;
 identifying based on the received interference level information, an indication of an interference on the downlink radio channel, which interference is caused by a downlink transmission from the first base station to the first user equipment; and
 sending to the first base station the indication of the interference, thereby assisting the first base station in handling a further downlink transmission to be performed in a further subframe during which interference on the downlink radio channel is to be avoided.

16. The method of claim 15, wherein the interference level information comprises channel quality measurement (CQI) information related to the radio channel, or Hybrid Automatic Repeat Request (HARQ) information related to the radio channel, or both.

17. The method of claim 15, further comprising aggregating interference level information related to more than one subframe during which the first base station is to avoid interfering, or related to more than one second user equipment, or both, and wherein the indication of the interference is further based on the aggregated interference level information.

18. The method of claim 17, further comprising statistically analyzing the aggregated interference level information, and wherein the indication of the interference is further based on the result of the statistical analysis.

19. The method of claim 18, further comprising receiving, from the first base station, parameter settings used by the first base station for the downlink transmission, and wherein the statistical analysis is further based on the parameter settings.

20. A second base station for assisting a first base station in handling a downlink transmission, which first base station serves a first user equipment, the second base station comprising:
    a receiver, configured to receive from a second user equipment an interference level information, which second user equipment is served by the second base station and is located in an extended range of the second base station, which extended range is an area in which a downlink signal transmitted from the first base station is stronger than a downlink signal transmitted from the second base station, which interference level information is related to a downlink radio channel between the second base station and the second user equipment, and which interference level information is further related to a subframe in which the first base station is to avoid interfering the downlink radio channel;
    an identification unit configured to identify an indication of an interference on the downlink radio channel based on the received interference level information, which interference is caused by a downlink transmission from the first base station to the first user equipment; and
    a sending unit configured to send to the first base station the indication of the interference, thereby assisting the first base station in handling a further downlink transmission to be performed in a further subframe during which interference on the downlink radio channel is to be avoided.

21. The second base station of claim 20, wherein the interference level information comprises channel quality measurement (CQI) information related to the radio channel, or Hybrid Automatic Repeat Request (HARQ) information related to the radio channel, or both.

22. The second base station of claim 20, further comprising an aggregating unit configured to aggregate interference level information related to more than one first subframe during which interference is to be avoided, or related to more than one second user equipment, or both, and wherein the indication of the interference is further based on the aggregated information.

23. The second base station of claim 22, further comprising an analyzing unit, configured to statistically analyze the aggregated information, and wherein the indication of the interference is further based on the result of the statistical analysis.

24. The second base station of claim 23, wherein the second base station further comprises a receiving unit configured to receive from the first base station parameter settings used by the first base station for the downlink transmission, and wherein the statistical analysis is further based on the parameter settings.

\* \* \* \* \*

UNITED STATES PATENT AND TRADEMARK OFFICE
CERTIFICATE OF CORRECTION

PATENT NO. : 8,879,492 B2
APPLICATION NO. : 13/518013
DATED : November 4, 2014
INVENTOR(S) : Folke et al.

It is certified that error appears in the above-identified patent and that said Letters Patent is hereby corrected as shown below:

On the Title Page, item (57), under "ABSTRACT", in Column 2, Line 8,
delete "second base station (120)." and insert -- second base station (115). --, therefor.

In the Specification

In Column 6, Line 44, delete "second user second equipments" and
insert -- second user equipments --, therefor.

In Column 8, Line 51, delete "user second" and insert -- second user --, therefor.

In Column 8, Line 57, delete "second user equipments 120." and
insert -- second user equipments 125. --, therefor.

In Column 9, Line 64, delete "first" and insert -- first user --, therefor.

In Column 14, Line 15, delete "second base station 125" and
insert -- second base station 115 --, therefor.

In Column 15, Line 19, delete "second base station 125" and
insert -- second base station 115 --, therefor.

In Column 16, Line 5, delete "640 is" and insert -- 650 is --, therefor.

In Column 16, Line 40, delete "first base station 120" and
insert -- first base station 105 --, therefor.

Signed and Sealed this
Twenty-eighth Day of July, 2015

Michelle K. Lee
*Director of the United States Patent and Trademark Office*